Feb. 23, 1937.   J. F. KORDA   2,071,635
METHOD OF BAKING
Filed Nov. 26, 1930

INVENTOR.
James F. Korda
BY
Fay, Oberlin & Fay
ATTORNEYS

Patented Feb. 23, 1937

2,071,635

UNITED STATES PATENT OFFICE

2,071,635

METHOD OF BAKING

James F. Korda, Cleveland, Ohio, assignor to Thomas S. Donnelly, Detroit, Mich.

Application November 26, 1930, Serial No. 498,337

3 Claims. (Cl. 107—54)

This invention relating as indicated to a method of baking, has specific reference to a method for producing certain types of baked goods, such as bread and the like, which has among its distinguishing characteristics a crust of the texture produced by having the dough from which the baked article is made deposited directly upon the hearth of the oven, and the remaining surface of the dough exposed to the hot air or the like within the baking oven.

As is well known, one particular disadvantage of baked goods produced in the above described manner is that the loaf or the like, due to its being deposited on the hearth of the oven without any lateral confining means therearound has an undesirable form of cross section. It is among the objects of my invention to provide a method of and apparatus for baking bread and the like in accordance with the hereinbefore described method, but which produces a loaf having the proper cross sectional form without sacrificing any of the desirable characteristics of such product. Other objects of my invention will appear as the description proceeds.

To the accomplishment of the foregoing and related ends, said invention, then, consists of the means hereinafter fully described and particularly pointed out in the claims. The annexed drawing and the following description setting forth in detail certain structure embodying the invention, such disclosed means, constituting however, but one of various mechanical forms in which the principle of my invention may be used.

Figure 1:
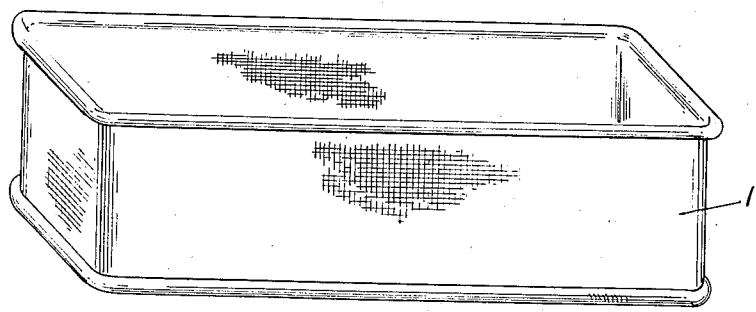
Figure 2:
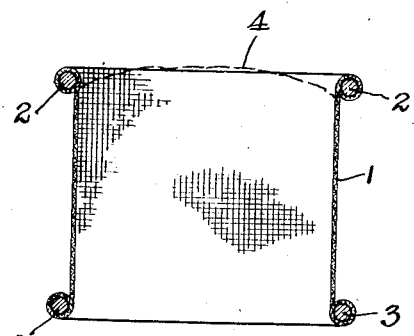

In said annexed drawing:

Fig. 1 is a perspective view of the pan comprising my invention, and designed to be employed for the purpose of carrying out the hereinafter described method. Fig. 2 is a transverse sectional view of the pan illustrated in Fig. 1.

Referring more specifically to the drawing, the pan here illustrated consists of a substantially rectangular frame 1 of screening or like foraminous material which is reinforced along the upper and lower edges thereof by having such screening formed around and secured to reinforcing rod means 2 and 3. The screening, when formed in this manner, provides an open ended lateral confining means for the dough which will be placed directly on the bed or floor of the bake oven and which during the ensuing baking operation will rise to approximately the line indication cated at 4.

By employing a pan of the above described character, the dough will be placed directly on the hearth of the bake oven with the screen frame positioned therearound during the ensuing baking operation. The foraminous character of the lateral confining means permits the oven gases to come in intimate contact with the surface of the dough to produce a crust thereon having a texture identical to the crust formed by simply placing the dough on the bed of the bake oven without providing any lateral confining means. The confining screen member shapes the dough as it rises during the baking operation, into substantially rectangular form, so that the resultant loaf may be cut into slices and used in any desirable manner, which, due to the substantial cross section thereof eliminates considerable waste and further adapts such slices to uses not possible with the cross section thereof in the form heretofore made. It is believed that a further description of this invention is unnecessary for those familiar with the art of baking, and numerous advantages result which are so apparent that a repetition thereof is unnecessary.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The method of baking hearth bread which comprises placing an elongated lump of dough on the hearth of an oven, and baking the lump of dough on the hearth while confining the longitudinal expansion of the dough to a predetermined length and while the bottom and top of the lump of dough are directly exposed to the heat of the oven, whereby a loaf of hearth bread of predetermined length and freely expanded top surface is formed.

2. The method of baking hearth bread which comprises placing a lump of dough for an isolated single loaf of bread directly on the hearth of an oven, limiting expansion of said dough laterally, and baking the dough under said conditions.

3. The method of baking hearth bread which comprises placing a lump of dough for an isolated single loaf of bread directly on the hearth of an oven, limiting expansion of said dough laterally in all directions parallel to the hearth, and baking the dough under said conditions.

JAMES F. KORDA.